United States Patent
Groeneveld

(10) Patent No.: US 11,640,653 B2
(45) Date of Patent: May 2, 2023

(54) METHOD TO CORRECT SATELLITE DATA TO SURFACE REFLECTANCE USING SCENE STATISTICS

(71) Applicant: David P. Groeneveld, Hartford, SD (US)

(72) Inventor: David P. Groeneveld, Hartford, SD (US)

(73) Assignee: Advanced Remote Sensing Inc., Hartford, SD (US)

( * ) Notice: Subject to any disclaimer, the term of this patent is extended or adjusted under 35 U.S.C. 154(b) by 292 days.

(21) Appl. No.: 16/918,291

(22) Filed: Jul. 1, 2020

(65) Prior Publication Data

US 2021/0142447 A1 May 13, 2021

Related U.S. Application Data

(60) Provisional application No. 62/921,710, filed on Jul. 1, 2019.

(51) Int. Cl.
| | |
|---|---|
| *G06T 5/00* | (2006.01) |
| *G06T 7/80* | (2017.01) |
| *G06V 20/10* | (2022.01) |
| *G01J 3/28* | (2006.01) |

(52) U.S. Cl.
CPC ............ *G06T 5/002* (2013.01); *G01J 3/2823* (2013.01); *G06T 7/80* (2017.01); *G06V 20/188* (2022.01); *G01J 2003/2826* (2013.01); *G06T 2207/10036* (2013.01); *G06T 2207/10048* (2013.01); *G06T 2207/30188* (2013.01)

(58) Field of Classification Search
CPC .... G01J 3/28; G01J 3/2823; G01J 3/42; G01J 2003/425; G01J 2003/2826; G06T 5/002; G06T 7/80; G06T 2207/30188; G06T 2207/10048; G06T 2207/10036; G06V 20/188; G01N 21/538; G01N 2021/1795; G01N 2021/1797
See application file for complete search history.

(56) References Cited

PUBLICATIONS

Hagolle, Olivier, et al. "A multi-temporal and multi-spectral method to estimate aerosol optical thickness over land, for the atmospheric correction of FormoSat-2, LandSat, VENµS and Sentinel-2 images." Remote Sensing 7.3 (2015): 2668-2691. (Year: 2015).*
Sola, Ion, et al. "Assessment of atmospheric correction methods for Sentinel-2 images in Mediterranean landscapes." International journal of applied earth observation and geoinformation 73 (2018): 63-76. (Year: 2018).*

* cited by examiner

*Primary Examiner* — Vu Le
*Assistant Examiner* — Tracy Mangialaschi
(74) *Attorney, Agent, or Firm* — Scale LLP

(57) ABSTRACT

A method for correcting top-of-atmosphere reflectance data in high altitude imagery to a ground surface reflectance data. Transmission of light through Earth's atmosphere and its suspended load of aerosol particles degrades light within the visible through near infrared portion of the spectrum. This can severely affect the quality of the data recorded by orbiting Earth observation satellites. The method first measures the degree of atmospheric effects upon reflectance, then reverses these effects to deliver surface reflectance data and imagery cleaned of haze and thin clouds.

6 Claims, 4 Drawing Sheets

METHOD TO CORRECT SATELLITE DATA TO SURFACE REFLECTANCE USING SCENE STATISTICS

CROSS REFERENCE TO RELATED APPLICATIONS

This application claims priority to and the benefit of the filing of U.S. Provisional Patent Application Ser. No. 62/921,710 entitled "Method to Correct Top-of-Atmosphere Satellite Data to Surface Reflectance Using Scene Statistics," filed 1 Jul. 2019, the entire disclosure of which is incorporated herein by reference.

BACKGROUND OF THE INVENTION

Field of the Invention

This invention relates generally to imagery recorded by Earth Observation Satellites or ultra-high flying aircraft, and restoring the imagery to surface reflectance after removing the effects of thin clouds, smoke, dust and other effects that degrade the utility and clarity of the imagery for automated analysis or viewing.

Background Information

To feed the growing global population, Earth observation satellites (EOS), and software-based analytics are being applied to support agriculture's effort to maximize yield while minimizing resource investment. Orbiting (EOS), including high altitude drones flying above commercial air traffic, are scale-appropriate for this mission. A major challenge for EOS data interpretation is that they look through the atmosphere that contains suspended particles and gasses that alter the transmission of light. These influences vary greatly through time and induce noise in the digital signal recorded especially impacting analysis to support global agriculture; a leading non-defense-related application for EOS data.

Through scatter and absorption, aerosol particles alter the reflectance of the Earth's surface recorded by the EOS. Reflectance is the dimensionless ratio of reflected light normalized by the light reaching the target from the sun. Reflectance enables measuring and quantifying Earth level processes and why EOS data have value. For the present disclosure, a focus is orbital EOS that measure reflected light from the Earth that is altered during its transmission through the atmosphere. Without correction, all top of atmosphere (TOA) data from EOS reflectance have been degraded due to processes of scatter and attenuation.

As described herein, the presently disclosed method calculates surface reflectance from TOA; "surface reflectance" is the reflectance that would be recorded by observations on the ground. One primary use of TOA data corrected to surface reflectance is for automated processing to measure and map various Earth processes, for example automated mathematical characterization of crop performance as the crop grows and develops. For a healthy cropped field, the surface reflectance expressed through time by any objective metric, would have a smooth growth curve that changes slowly from day to day over the season. Expressed as TOA reflectance with incorporated atmospheric distortion, curves of vegetation indices using TOA can represent vegetation growth incorrectly with vegetation indices rising and falling according to the influence by the airmass between the ground and the EOS. The atmospherically induced alteration of reflectance is highly variable across the millions of square kilometers viewed by an EOS.

To correct EOS TOA reflectance to surface reflectance, any method must first isolate the spatially varying effects across the image. Atmospheric scatter and absorption are highly structured, so if this structure is understood and measured across EOS images, it can be reversed in a sensitive, spatially discrete manner using only scene statistics. This is a different and simpler approach than existing methods, and an approach that may offer greater utility.

Aerosols are any non-air molecule. Aerosols entrained in the atmosphere have the greatest effect upon reflectance and commonly include water droplets (clouds), ice crystals (also as clouds), smoke, dust, pollen, fungal spores, and salt grains evaporated from the ocean by onshore-wind-entrained droplets. The metric adopted for the variable atmospheric particulate content is aerosol optical depth (AOD), a scalar value. As AOD increases, so too does the degree of scatter and absorption of light. Though specific to description of aerosols, for this introduction we use AOD as a general indicator of atmospheric effects because it is well known in the art to have the greatest effect upon reflectance of all the influencing factors.

A secondary reason to correct EOS images to surface reflectance is for clearing of haze visible on TOA images to enhance viewing landscapes and features. If the surface reflectance is correct, the mathematical transformation removes haze from the corrected image. Visually, haze in images is an indicator of moderate atmospheric degradation that renders the image unusable for many purposes. Severe degradation renders ground features indistinct and un-useable for all purposes.

EOS images consist of rasters, defined as maps created by a grid of values, called pixels, in known geoposition that are square and abutting all surrounding pixels. The raster format is convenient for mathematical manipulation and is central to remote sensing analyses. A person with ordinary skill understands that the calculations necessary for methods of the present disclosure, or for any remote sensing measurements require a computer and software to manipulate EOS data mathematically as rasters.

TOA images are well known in the field of remote sensing science and easily obtainable from multiple sources. For example, these calculations are described in the Landsat Data User Handbook (USGS, 2019) and in the Technical Guides published online by European Space Agency for their EOS (ESA, undated). EOS measure data in broad bands of the electromagnetic spectrum, commonly in the visible portion as blue, green, and red, and just beyond visible light, near infrared (NIR). This combination of bands is commonly referred to as VNIR. The bands can be combined variously for visual display as color using blue, green, and red bands or as color infrared using green, red and NIR, also known as false color, that visually enhances differences in crop type and health. For automated analysis of vegetation or crop performance, digital data are combined mathematically in various ways depending upon the analysis desired. VNIR EOS are called multiband, because the data are collected in multiple, but relatively few, slices of light, for example from three to ten bands.

Atmospheric effects upon reflectance include backscatter and attenuation that, when expressed as a cumulative distribution function (CDF) for a raster of points of any band, graphically resembles a pinwheel that turns about an axis, as depicted graphically in FIG. 1. As AOD increases, counter-clockwise rotation of the CDF increases reflectance at the lower end of the distribution due to backscatter from the aerosol particles, and at the upper, brighter end of reflectance, reducing reflectance due to attenuation. At some point in the reflectance distribution in between, the effects of backscatter and attenuation cancel each other, and the reflectance remains constant—this defines an axle point about which the values rotate due to the atmospheric effects.

This pinwheel effect is informational to the presently disclosed method, and prompted investigation to understand the structure of AOD changes resulting in TOA reflectance. The pinwheel effect defines opposite forces of scatter and attenuation causing high reflectance to decrease and low reflectance to increase. This conceptual model is especially important in the study of vegetation canopies, including agricultural crops whose growth and health can be tracked with vegetation indices through time to influence crop care and to enable accurate estimation of yield. Changes in crop vigor expressed through a vegetation index can also be used to identify and map anomalies and crop problems to focus greater attention.

The most commonly deployed EOS record reflected light in the VNIR bands that can be combined in certain ways to track important features. Leaves of living plants appear green because those wavelengths are less absorbed by the plant. Blue and red light are absorbed by plant pigments to power photosynthesis or deal in other ways with the solar energy they receive. NIR is reflected from verdant plant canopies while the residual blue and red reflectances are greatly diminished by photosynthetic absorption, as illustrate in the example shown in FIG. 2. While the blue band responds to an even greater degree than red due to photosynthetic absorption, blue is generally not used for this purpose because it is affected more than the other bands by AOD. Hence, EOS vegetation indices use ratios of red and NIR bands.

The most commonly used method for expressing vegetation or crop activity is the normalized difference vegetation index (NDVI). NDVI is unitless and calculated from red and near infrared broad bands of satellite data according to the NDVI Equation, NDVI Equation: $NDVI=(NIR-Red)/(NIR+Red)$ where NDVI is the normalized difference vegetation index, NIR is near infrared reflectance, and Red is red reflectance.

As in FIG. 2, verdant vegetation, for example a thriving cropped field, will have low red reflectance and high NIR reflectance. Combining the distribution of vegetation reflectance as in FIG. 2 with the pinwheel effect indicated in FIG. 1, it is seen that increasing AOD diminishes the vegetation signal by increasing the reflectance of dark targets (red), while highly reflectant targets such as NIR are reduced. The effect from increasing AOD upon NDVI is an apparent synergistic decrease of vegetation vigor. Because of this effect, AOD hampers reliability for all vegetation indices calculated from TOA, including NDVI. The highest and most correct value of NDVI is generated from surface reflectance. Once corrected to surface reflectance EOS data enables a suite of automated analyses that rely upon ratios as is illustrated by the NDVI equation. Without surface reflectance, variability in TOA reflectance renders such analyses unreliable.

NDVI is mentioned throughout the disclosure hereinbelow as an example of vegetation indices, of which there are potentially multiple formulations, all employing at least the red and NIR bands. A person with ordinary skill in the art will recognize that anywhere NDVI is mentioned herein, other vegetation indices could likewise be employed. Hence, this presently disclosed methodology encompasses all applications wherein other vegetation indices could be substituted for NDVI.

SUMMARY OF THE PRESENT INVENTION

Transmission of light through Earth's atmosphere and its suspended load of aerosol particles degrades light within the visible through near infrared portion of the spectrum. This can severely affect the quality of the data recorded by orbiting Earth observation satellites. The present method first measures the degree of atmospheric effects upon reflectance then reverses these effects to deliver surface reflectance data and imagery cleaned of haze and thin clouds.

BRIEF DESCRIPTION OF THE DRAWINGS

The accompanying drawings, which are incorporated in and form a part of the specification, serve to promote an understanding of the invention. In the drawings.

DETAILED DESCRIPTION OF THE EMBODIMENTS OF THE INVENTION

Figure 1:
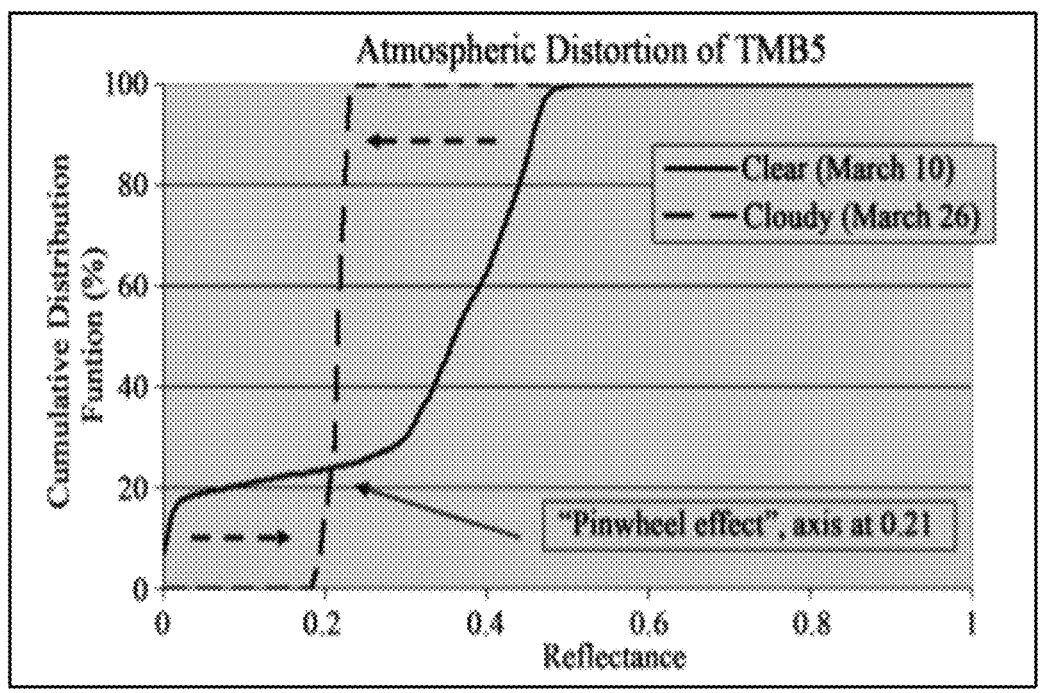
FIG. 1 graphically illustrates the pinwheel effect known in the art and coined by Groeneveld and Barz, demonstrated for the shortwave infrared band of Landsat TM 5, with the cumulative distribution function as the graphical range, and the reflectance as the domain.

The presently disclosed methodology may be called "Simplified Atmospheric Correction Method" (SACM) because it is computationally simpler than known techniques that seek to understand "radiance," i.e., the flux of light received by EOS sensors to mathematically reconstitute and factor the known effects of atmospheric physics. Rather than a focus on radiance, SACM is the result of heuristic investigation of reflectance through empirical study of TOA upon measured surface reflectance. Reflectance is the metric of value that results from EOS and not radiance, therefore, solving atmospheric correction is more direct using reflectance.

The primary use for the methods of SACM is for areas of verdant vegetation, and where lacking, can revert to the calibration of the SACM calibration to ancillary data or other technique. A major benefit of SACM is that the highest levels of precision and accuracy are produced by regions that have sufficiently verdant vegetation (SVV), in crops that are irrigated or rainfed. This affords a quick and accurate calculation of surface reflectance that is provided rapidly. Where SVV is lacking, assessment of surface reflectance can take place through the use of ancillary data that are calibrated to SACM.

The following points contrast the present methods with the existing art when applied to locations with SVV:

1) This SACM method ignores sensor radiance, performing all calculations through the use of TOA reflectance. In contrast, all existing methods for calculation of surface reflectance begin with radiance, also called radiative transfer functions that have minimal application of reflectance.
2) By working with reflectance, the SACM is more direct and efficient—first identifying the degree of the atmospheric effect and then reversing it. In contrast, existing methods rely upon theoretic and comparatively complex relationships to characterize how radiance is affected by scatter, absorption, and transmission that must be optimized through iteration. Radiance based methods are computationally complex and therefore, require comparatively long computation time.
3) The presently disclosed methodology works for regions of verdant vegetation including cropland, and by extension through calibration to other areas lacking continuous canopies of vigorous and healthy vegetation by calibration of the SACM relationship to the ancillary data that are used by other methods. All other methods require spectral libraries, data from bands beyond VNIR or ancillary data from other satellites.
4) The present SACM methods map the actual change in reflectance occurring due to light scatter and attenuation separately for any band of light in the VNIR portion of the spectrum. This enables correcting a range of AOD that is approximately twice that of radiative transfer-based methods.
5) The present methodology is based upon reflectance relationships and not upon radiometry, so it is applicable to all EOS, without regard for whether their radiometry is known or not. This enables the potential correction of small and comparatively inexpensive EOS, often called cubesats, that omit onboard equipment for radiometric calibration to save weight and size.
6) This SACM method has demonstrated ability to clear scenes with AOD well beyond the capability of existing methods, therefore enabling spinoffs for defense purposes where thin clouds, smoke or dust can occlude mission-critical ground conditions.

Many terms used in this description of SACM are applicable only to the field of remote sensing and many are coined here specifically for the new science required. These terms are listed and explained here. Technical terms of existing art are denoted where appropriate, as "commonly used"; all are well known in this field. All other terms are unique and applied here to describe the steps for SACM calibration and operational application. These terms are capitalized in the text and bolded here to call attention to the fact that these are descriptive terms unique to this present art.

aerosol optical depth (AOD)—a commonly used term to describe a dimensionless index for the influence of suspended particles upon TOA reflectance. AOD has the largest effect, by far, of several atmospheric factors.

Figure 3:
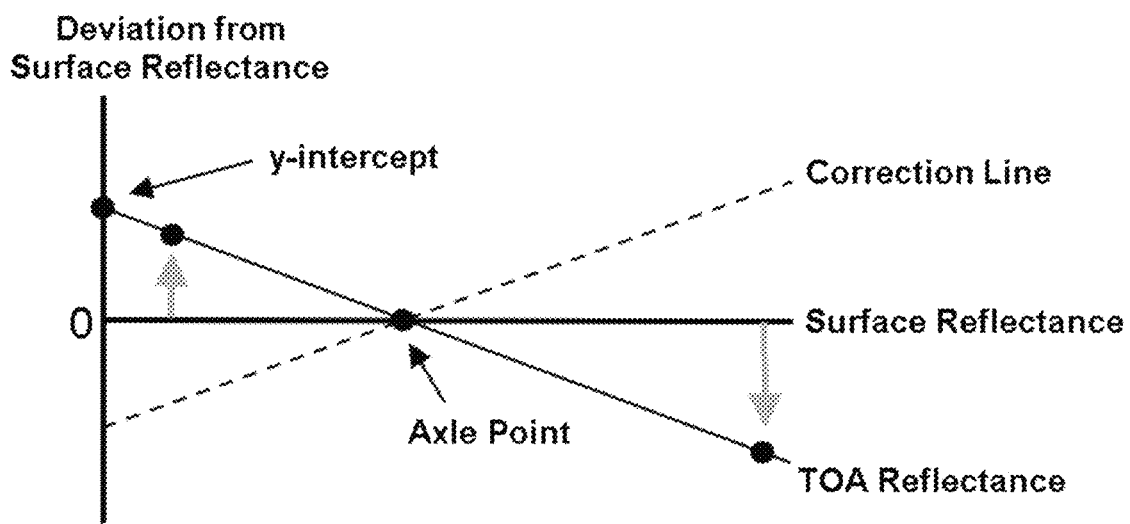
FIG. 3 is a graphic plot to visualize the pinwheel effect used in the present invention to determine the surface reflectance correction for any band.

Axel Point—a point defined by y=0 for every TOA or correction line shown in FIG. 3.

Axel Point Relationship—a relationship defining how the point y=0 changes according to the input variable, TOA minB, that determines the y-intercept and slope of each correction line.

EOS—a commonly used abbreviation for Earth observation satellite that include the optical satellites described within this present art. As used here, EOS is both singular and plural.

EOS Calibration Set—the set of calibrated values for each VNIR Band of an EOS consisting of a range of measured values of TOA minB, and the associated slopes and y-intercepts of TOA lines as shown in FIG. 3.

groundtruth—a commonly used term for measurements made on the ground for comparison to EOS data. For this discussion, groundtruth specifically means surface reflectance acquired by a portable spectrometer.

Image and scene—are both common descriptors used interchangeably here for an EOS raster that is subjected to TOA-to-surface reflectance correction.

minB—blue surface reflectance from sufficiently verdant vegetation (SVV) that represents plant control of blue surface reflectance to a consistently narrow and low reflectance range.

NDVI—Normalized Difference Vegetation Index is the most commonly used index to measure vegetation activity according to the mathematics of the NDVI Equation.

NDVI Surface Reflectance Threshold—a threshold to discriminate SVV that is chosen through iterative comparison of continuous, vigorous, and healthy vegetation canopies exposed to the sky and its measured minB.

NDVI TOA Raster—a raster of NDVI pixel values calculated per the NDVI Equation.

NDVI TOA Threshold—a threshold calculated for a pixel TOA blue reflectance to assess whether the blue reflectance is derived from SVV within that pixel. NDIV TOA values higher than the threshold indicates that the associated blue reflectance is a valid TOA minB.

NDVI TOA Threshold Relationship—a relationship calculated by inverting the calibrated SACM Relationship to assess the effect of minB upon the red and NIR reflectance band for a range of minB inputs expressed as a curve of NDIV TOA Threshold values.

NIR—a commonly used abbreviation for the near infrared spectral band of EOS.

NIR Surface Reflectance Reference—is the NIR surface reflectance that contributed to the NDVI Surface Reflectance Threshold.

Reflectance Reference—is a value translated from the NIR Surface Reflectance Reference for a range of TOA minB by inversion of the SACM Slope Calibration in development of the NDVI TOA Threshold Relationship.

Pixel Grid Sampling—is an operation performed by sampling across an image raster with non-overlapping gridcells, performed specifically to identify TOA minB values for the image-specific SACM Input Raster.

radiance—a measure of the flux of light recorded by an instrument, for example a spectrometer or an EOS spectral band.

raster—a commonly used term for a rectangular pattern of parallel lines of pixels forming an image. For EOS remote sensing, these pixels are square and abut one another without spacing.

raster math—a commonly used term for mathematical calculations performed for rasters, for example, addition, subtraction and division of red and NIR spectral bands that results in a raster of NDVI values.

Red Surface Reflectance Reference—is the red surface reflectance that contributed to the NDVI Surface Reflectance Threshold.

TOA red Reflectance Reference—is a value translated from the Red Surface Reflectance Reference for a range of TOA minB by inversion of the SACM Slope Calibration in development of the NDVI TOA Threshold Relationship.

reflectance—a commonly used term for a unitless ratio of the light reflected from a ground target normalized by the sunlight impinging upon it.

relative spectral response (RSR)—a common term for the intra-band sensitivity of a spectral band recorded by an EOS sensor.

SACM Calibration—defines the slope and y-intercept for use in correcting the TOA pixel values to surface reflectance pixel values for VNIR bands.

SACM Equation—Simplified Atmospheric Correction Method; method equation that corrects TOA reflectance for all bands for each pixel to surface reflectance. The SACM Equation uses calibrated slope and y-intercept values defined by TOA minB input to define a correction line for each band of each EOS that enables differential correction across an image.

SACM Input Raster—a raster filled with TOA minB values that were determined by measurements of TOA minB within gridcells distributed across the EOS image.

spectrometer—an instrument for highly calibrated measurements of surface reflectance or radiance.

surface reflectance—is a commonly used term for reflectance that would be measured at ground level and the objective for all EOS atmospheric correction. Surface reflectance can be measured directly using a field spectrometer.

SVV—Sufficiently Verdant Vegetation; is defined as a pixel exceeding a set value of surface reflectance NDVI chosen to represent a continuous, vigorous, and healthy vegetation canopy growing under an open sky. For simplicity, SVV is determined using a NDIV TOA Threshold calculated as a function defined by the pixel's blue reflectance. Blue reflectance from an SVV is a valid TOA minB for use driving the SACM correction to surface reflectance.

TOA—top of atmosphere, is a commonly used term referring to the radiance or reflectance that the EOS sensor records above the atmosphere. TOA data are changed by variable atmospheric factors, so must be converted to surface reflectance for reliable detection of many Earth surface properties.

TOA MinB—is a TOA blue reflectance measured over sufficiently verdant vegetation (SVV) by the EOS and used as input to SACM for operational correction of TOA reflectance to surface reflectance. TOA MinB is a surrogate measure of the lump-sum effect of atmospheric influences on reflectance. Surface reflectance of SVV exhibits consistent low values of blue surface reflectance because plants exposed to the open sky control the amount of reflectance to only a small proportion of the blue light received from sunlight.

VNIR—is a common abbreviation for visual and near infrared that are the broad band combinations commonly borne on most EOS. The number of bands generally number ten or fewer. Visual bands generally comprise blue, green and red.

A further discussion of known processes for correcting TOA reflectance may here be useful. The prior art can be classified into two types that are based upon radiance that we differentiate here as static and dynamic. Static methods, for example Modtran® (MODerate resolution atmospheric TRANsmission Program; Spectral Sciences Incorporated), consists of computer code that can deliver accurate estimates of surface reflectance from TOA data dependent upon input of other ancillary data generated through onsite measurements available only in few very restricted locations with equipment that must be operated during the EOS overpass. Though valuable for research, static methods are not appropriate for operational use because the solutions generated by a static method are only good for the location and time when ancillary data are measured and are not applicable EOS images.

European Patent EP287222181 and U.S. Pat. No. 9,396,528 disclose dynamic methods employing a combination of solutions for the equations in Modtran®, known atmospheric parameters, and a library of radiance values appropriate for historical surface reflectance to derive an expected AOD. Radiance values in the image are changed iteratively to match the expected radiance values and these are then used to solve for surface reflectance.

Two dynamic methods are in use routinely for public consumption through the United States' Landsat program (called LaSRC) and the Sentinel 2 program operated by the European Space Agency (called Sen2Cor). For the Landsat program, the method uses a generic approach that solves for AOD by looping through the calculations to optimize for the lowest residual error, then using this value to solve for surface reflectance (Vermote et al., 2008; Vermote et al., 2016). For the Sentinel 2 program, a radiative transfer function is used according to Richter et al (2006) that applies the methods of Kaufman and Sendra (1988) to estimate AOD input through correlation to a ratio of visible and SWIR bands. Both LaSRC and Sen2Cor methods incorporate ancillary data from the Moderate Resolution Imaging Spectroradiometer (MODIS; NASA, undated) EOS to drive the calculations.

Reliance upon ancillary data is problematic for operational correction of EOS because the appropriate ancillary data may not be available in many cases. One problem that cannot be overcome is the timing of the ancillary data set and the paucity of such ancillary satellites (two EOS platforms). EOS data may be collected at a time of day that may be ill-timed with respect to the overpass time of ancillary EOS that could be several hours off. A best-case example is the overpass of both Sentinel 2 and Landsat 8 EOS over the equator at about 10:00 am relative to the overpass of the MODIS ancillary EOS gathered at 10:30 am. Even in the comparatively short time span of a half hour for this example, winds aloft can move cirrus and other particulates so that a snapshot of ancillary data no longer represent the atmospheric effects spatially. Without significant winds aloft, cirrus clouds can form or dissipate rapidly in this time period, especially due to ephemeral commercial jet contrails. Thus, use of ancillary EOS data is a poor solution relative to atmospheric correction using statistics derived solely from the scene to be corrected. SACM avoids this problem where SVV exists by using only scene statistics, alone, for image correction.

The present method is also appropriate for high altitude drone or balloon platforms flying well above commercial air traffic. For example, drones may fly at altitudes of 60,000 feet or more and the data they collect needs surface reflectance correction because light must pass through more than 90% of the atmosphere at those altitudes. The present method can be used to correct digital aerial imagery and remove thin clouds, dust, smoke, and fog in the imagery when the data are collected at any elevation.

Further investigation of the pinwheel effect disclosed that the changes from surface reflectance to TOA reflectance were linear, a finding that led to investigations that revealed how to identify the structure of atmospheric effects—the changes in reflectance due to scatter and absorption. The present method exploits the pinwheel effect by first identifying the atmospheric spectral distortion, then reversing it mathematically to obtain surface reflectance (SR in the following discussion). FIG. 3 is a generalized portrayal of the distortion in TOA reflectance that occurs due to the pinwheel effect, illustrated for some unspecified magnitude AOD. The x-axis of FIG. 3 is SR and the y-axis is the reflectance change recorded by the EOS, defined mathematically as the deviation from surface reflectance, TOA-SR. Two measured points from dark and light targets are shown that establish a line representing TOA reflectance. Due to the effects from AOD, the darker reflectance lying below the axle point is enhanced through backscatter (gray arrow up) and brighter reflectance values above the axle point are decreased due to attenuation (gray arrow down). The additive inverse of TOA Reflectance is an additive correction line (shown as dashed in FIG. 3) that, when added to the TOA value for any pixel, yields the SR value for that pixel.

Adding the additive inverse of the TOA line, the dashed single line of FIG. 3, reverses the atmospheric effect to correct any pixel of any magnitude TOA reflectance, dark to light for this hypothetical example. Each band of EOS sensors responds differently but in a similar manner. The graphic representation of SR correction shown in FIG. 3 is represented by the SACM Equation, $$SR=TOA-(m*TOA+b)/(1+m) \quad \text{SACM Equation:}$$

where SR and TOA are reflectance values for each pixel, and m and b are slope and y-intercept of the line that contains the two points described by low and high SR (x values) and TOA reflectance (y values).

The slope and y-intercept of the TOA line in FIG. 3 defines the TOA line and with reversal of signs also the additive correction line. The slope and y-intercept can be calibrated for various levels of AOD using known paired dark and light reflectance targets (designated by the up and down directional arrows). Each band must be calibrated to determine the appropriate slopes and y-intercepts across a range of AOD. This calibration is performed using multiple inputs of variable AOD, from relatively clear (low AOD) to highly affected (high AOD). The TOA reflectance is measured for the paired targets of known surface reflectance, light and dark, under the AOD effects imposed at the time of the EOS data capture. A sufficient number of points across a range of AOD conditions can be collected to support fitting curves to define the slope and y-intercept at each AOD level, as shown in the FIG. 4 example, for each band of each EOS with the x-axis being a surrogate measure of AOD.

Figure 4:
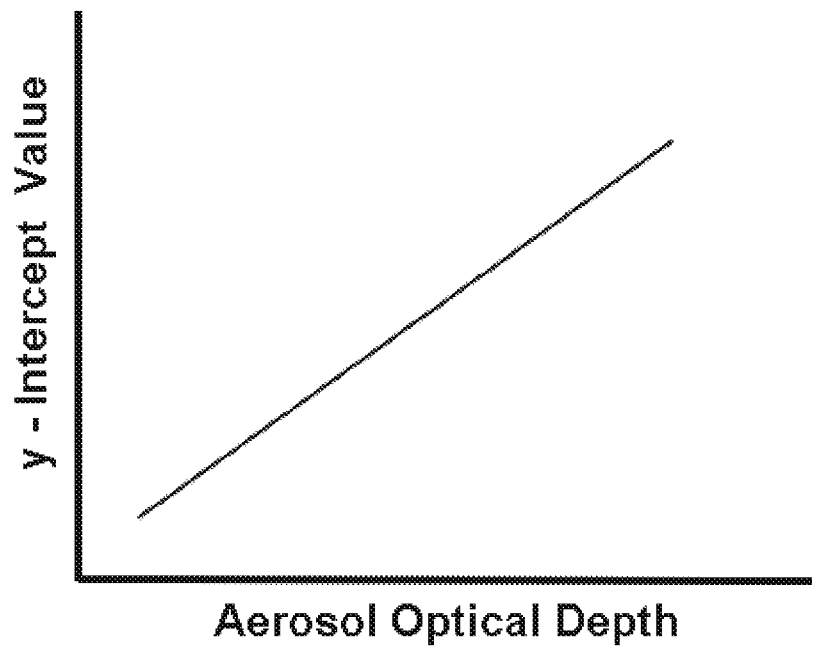
FIG. 4 is a generic graph illustrating an example of a y-intercept simplified atmospheric correction method calibration across a range of aerosol optical depths, according the present invention.

A multitude of solutions will exist for correction of TOA reflectance to surface reflectance, each defined, as with reference to FIG. 4, by the AOD. For any small region, the correction will tend to be the same because the AOD will be relatively constant. Typically, EOS images cover many thousands of square kilometers and many millions of pixels that are affected by variations in AOD magnitude across the image, even for conditions that, to the eye, may look clear in the image. For proper image correction, a measure of AOD for each pixel offers the most accurate correction. Such measurements are available only through ancillary EOS such as made by the MODIS EOS program, however, a time lag of days occurs between MODIS acquisition and product output and the data have coarse measurement granularity (0.05 degree=5.5 km at the equator; NASA, undated) insensitive to significant smaller-scale variation. Such data are also restricted by solar angle and pixels often lack data. Clearly, for timely, accurate and reliable correction to surface reflectance, a better solution is needed to assess AOD and other atmospheric effects, especially one derived solely using scene statistics that avoid these limitations.

The blue band is highly affected by AOD, more so than bands with longer wavelengths, for example green, red and NIR. Longer wavelengths than VNIR remain relatively unchanged by AOD. It is known from the pinwheel effect that low values of V reflectance are enhanced by light backscatter. TOA blue reflectance measured over targets with known surface reflectance can, therefore, be used as a surrogate to estimate AOD effect. Deep, clean water can be hypothesized to have reflectance of zero but water is a poor target because of specular reflectance from waves and water bodies are not reliably present to enable atmospheric correction.

Figure 2:
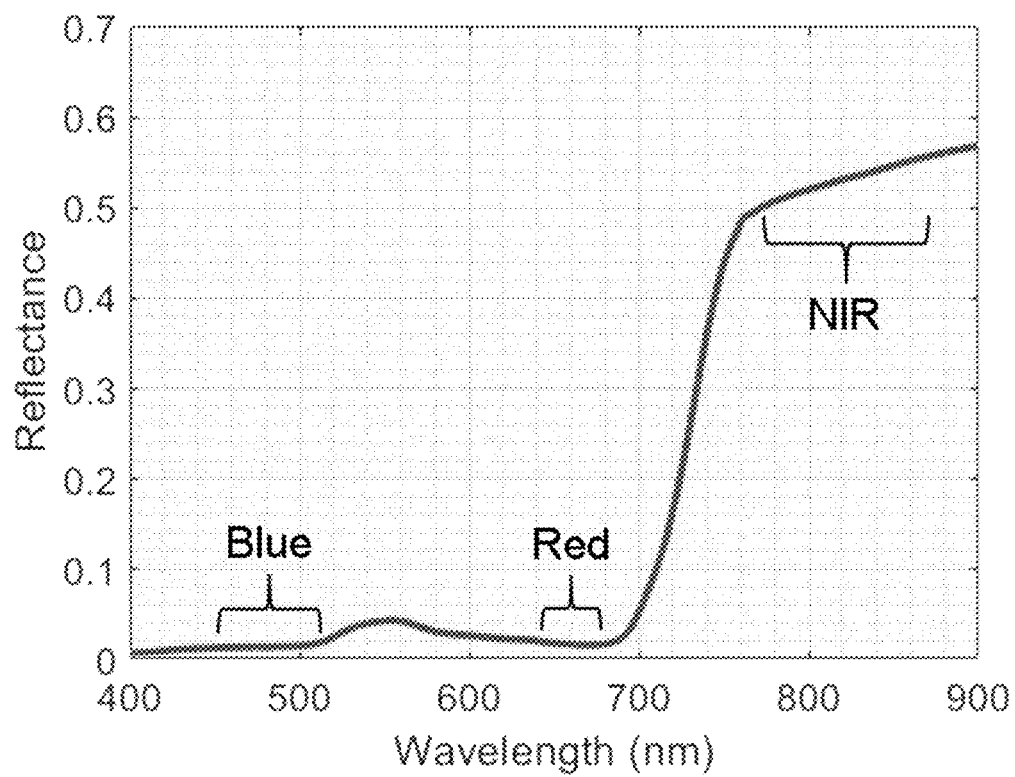
FIG. 2 graphically illustrates surface reflectance measured on the ground, using a spectrometer on verdant lawn grass showing red and blue absorbance features and high reflectance of NIR; the multiband windows shown are for the Sentinel 2 satellite, roughly equivalent to most other Earth Observation Satellites.

Reference is returned to FIG. 2. Due to photosynthetic absorbance, surface reflectance of blue light for continuous, vigorous, and healthy vegetation canopies (0.021 in FIG. 2) remains remarkably consistent within narrow minimum blue surface reflectance range for all high-light vegetation canopies, generally falling between 0.020 and 0.025 for Sentinel 2 EOS; a window that potentially varies depending upon the relative spectral response (RSR) of the blue band for the EOS. RSR is a measure of the intra-band sensitivity governing what is recorded by the EOS. High light, here, refers to those canopies exposed to open sky and direct sunlight, i.e., canopies not shaded.

Minimum blue surface reflectance is abbreviated herein as "minB" which is measured on continuous, vigorous, and healthy vegetation canopies. A person with ordinary skill in the art appreciates that as science advancement provides more whole canopy surface reflectance measurements, the minB, according to the present disclosure may undergo minor adjustment for some environments; such adjustments are not unexpected and accordingly may be adopted in the present method.

High light vegetation, including crops, shares physiologic properties that affect reflectance with other plant canopies grown under high light conditions. Solar radiation is a forcing function for all high light plants because it provides more light energy than can be used by photosynthesis, thus requiring plants to shed much of the energy received. Shedding this excess light is a widespread mechanism in plants adapted to high light conditions that is only now becoming understood to take place through the action of plant pigments (Guido, et al., 2017; Son, et al., 2020). The high light vegetation responsible for the controlled minB reflectance response are plants growing with their canopies exposed to the sky, thus facing the same major factor—highly variable and often excessive sunlight. Plants cannot use physical mechanisms to reduce light uptake and still be able to absorb it under shaded conditions, so must limit solar energy in other ways. This is done by accepting the light but processing only that energy needed for photosynthesis during high light conditions while dissipating the remainder through complex interaction with plant pigments. This optimization hypothetically results in the stable reflectance properties of vegetation canopies exposed to the open sky.

Useful to the processes of the present disclosure is that the optimization of solar energy by plants causes the minB reflectance properties to be consistent, thereby offering a surface reflectance benchmark for assessing the atmospheric effects resulting in the TOA reflectance. Blue reflectance from SVV canopies in excess of minB is the result of atmospheric effects, the basis of surrogate measurements of the atmospheric effects upon reflectance, and a mechanism enabling the present methodology. The TOA blue reflectance measured over SVV is "TOA minB". For standardization, "TOA minB" is defined as blue surface reflectance from sufficiently verdant vegetation (SVV) measured on a pixel basis, consisting of "a continuous, vigorous, and healthy vegetation canopy with NDVI meeting a calibrated surface-reflectance NDVI threshold. We designate this "NDVI Surface Reflectance Threshold", calibrated by minB field measurements for operational usage to isolate atmospheric effects.

Referring again to FIG. 4, TOA minB is the surrogate measure for the lumped sum of atmospheric influences used for calibration and operational application of SACM. For simplicity, the discussion herein above has used the term AOD as a generic descriptor for atmospheric effects. AOD, "aerosol optical depth", is more correctly restricted to discussing the specific effects due to particulate content. Though of far less influence, there are other atmospheric variables that are recognized as affecting TOA reflectance; for example, water vapor and ozone whose effects are included in both operational radiative transfer function methods, Sen2Cor and LaSRC, mentioned above. By measuring the TOA reflectance of nearly invariant surface reflectance of some ground target, we are measuring the cumulative effect of all influences, including particulates, water vapor, ozone, and even atmospheric thickness, an inverse property of the elevation of the measured surface above sea level. Hence, TOA minB measures the lumped sum effect of the atmosphere on the expected surface reflectance of SVV, especially within the spectral window for visual light. TOA MinB is therefore the most direct and simple means to evaluate the total atmospheric effects upon the changes in reflectance that occur between the orbiting EOS and the Earth's surface. Rather than "AOD", the "TOA minB" is used from hereafter in this specification.

Calibration for the SACM method requires two phases. The first phase locates SVV using the attributes that describe it, i.e., continuous canopies of vigorous and healthy vegetation. This first phase specifically calibrates the NDVI Surface Reflectance Threshold that can then be applied to determine where SVV occurs on the image to enable SACM application. Where SVV occurs, it can be used as a benchmark to assess atmospheric effect as TOA minB. The second calibration applies the relationships derived during the first phase to then calibrate all bands to the TOA minB as the driving variable to correct TOA reflectance to surface reflectance for each VNIR band.

The second phase in the calibration process measures the slopes and y-intercepts for the correction line as seen in FIG. 3 for multiple overpasses to capture the responses for each band across a range of TOA minB values expected for operational conditions. This requires many analyses of EOS overpasses of calibration targets with known surface reflectance from spectrometer measurements. The reflectance data are processed to represent surface reflectance using the RSR for each band of the EOS. Every overpass provides one point for each slope and each y-intercept of each band. These bandwise slopes and intercepts are recorded by TOA minB calculated for the TOA line of FIG. 3 at a surface reflectance representing the median value for all blue surface reflectance measurements of SVV. As an example, this median SVV blue surface reflectance that has been measured as approximately 0.0225 blue surface reflectance for Sentinel 2. The collections of slopes and y-intercepts are plotted in 2-dimensional space with the TOA minB as the independent variable to yield calibration relationships for application to derive the surface reflectance calculations according to the SACM equation.

Returning to the first phase of SACM calibration, the lowest NDVI surface reflectance measured for SVV is accepted as the NDVI Surface Reflectance Threshold and the contributing red and NIR values are the Red Surface Reflectance Reference and the NIR Surface Reflectance Reference. These reference values are then used to assess the effect of TOA minB that change NDVI.

Increasing TOA minB enhances the pinwheel effect, exerting greater change in TOA reflectance. NDVI Surface Reflectance can vary depending upon the sensitivity of the EOS in the red and NIR bands, so calibration is advisable for each different EOS. Due to the negative synergy from the pinwheel effect upon NDVI (see Background section), the magnitude of the NDVI Surface Reflectance Threshold can drop to less than 25% of that measured under heavy AOD conditions. Thus, the need to translate the NDVI Surface Reflectance Threshold into a "NDVI TOA Threshold" reflectance—defined here for further application as the limiting NDIV TOA to define SVV.

The NDVI TOA Threshold can be determined for any TOA minB in a one-time calibration for each EOS platform to yield an NDVI TOA Threshold Relationship to identify the NDIV TOA Threshold as calibrated to any SVV pixel's TOA blue reflectance. This calibration identifies the threshold NDIV TOA value representing the NDVI Surface Reflectance Threshold enabling confirmation that a blue reflectance is from SVV and if so, constitutes a valid TOA minB input to drive SACM correction. NDIV TOA values above the TOA-defined threshold identifies a pixel as SVV and therefore, TOA blue reflectance representative of the atmospheric effects; a TOA minB.

Calculating a NDVI TOA Threshold Relationship requires taking the Red Surface Reflectance Reference value and NIR Surface Reflectance Reference value that contributed to the NDVI Surface Reflectance Threshold and through inversion of the SACM Equation set forth above calculate a TOA red Reflectance Reference and an Reflectance Reference for a range of TOA minB inputs. These TOA minB-determined values are then combined into NDVI TOA values using the NDVI Equation. Fitting an equation to the resulting NDVI TOA distribution, using TOA minB as the independent variable provides a benchmark to determine if a pixel corresponds to SVV and therefore whether its associated blue reflectance constitutes a valid TOA minB.

TOA MinB is a competent measure of the overall atmospheric effect upon TOA reflectance because it evaluates the lumped effect of all atmospheric properties, and therefore, is a robust measurement of atmospheric effects spatially across the image. These influences include thin clouds since they consist of miniscule airborne water droplets or ice crystals, and hence, are particles that similarly scatter and attenuate reflectance. Using "thin" in this context to modify clouds requires that at least some ground signal has passed through the cloud to enable SACM correction. Clouds that completely occlude a ground signal cannot be corrected. A discussion of thin clouds is especially important to this art, because cirrus clouds are nearly always present over many environments and are not detected using VNIR data. TOA minB detects the effect from thin clouds upon reflectance lumped with other effects that clouds may occur combined with smoke or air pollution. Therefore, the present SACM method automatically detects and corrects the effects of thin clouds along with a suite of other factors lumped together as TOA minB, including cirrus clouds that commonly degrade images that would otherwise appear to be clear.

EOS images may contain wide ranges of TOA minB. To enable a sensitive statistically derived approach, it is necessary to derive a SACM Input Raster to spatially correct surface reflectance. Working with reflectance, rather than with radiance as does the known art, this SACM methodology offers more direct and accurate surface reflectance correction through mapping TOA minB across the image.

The SACM Input Raster can contain thousands of different TOA minB values to drive pixelwise calculations across the image. Statistical sampling of image properties to assess minB spatially for the SACM Input Raster enables spatially sensitive surface reflectance correction that is a significant advancement over the existing art, especially in regions of SVV in farmed and forested environments. The capability for TOA minB to derive differential spatial solutions at fine granularity, though is constrained by the need for SVV on which to determine this variable. For this reason, a primary use for these SACM processes is for agriculture. Otherwise, the SACM method can apply the same corrections at the low level of spatial resolution from ancillary data such as the MODIS EOS.

From the foregoing description of the method, how it works, and why it is unique and superior to existing methods, a person with ordinary skill in the art recognizes that there are many variations for approaching the generation of the SACM Input Raster with sampling and statistical analysis that do not fundamentally change the advantages of the present method. Thus, variations of the statistical methods for sampling to measure or estimate minB or TOA minB values are incorporated within this present invention. A person with ordinary skill in the art also appreciates that, while the method is calibrated here using blue reflectance, the method can be calibrated using green or red bands since reflectance in these bands is also greatly reduced by vegetation. Some EOS lack a blue band, in which case, the minB could be translated, for example, into a minG for the green band. Hence, though SACM methodology is more sensitively calibrated using the blue band because it is affected more greatly by atmospheric effects, correction of TOA reflectance to surface reflectance for an EOS can use the same procedures as outlined herein with alternative bands. Such alternative formulations are incorporated within this present invention.

A workflow according to the present method includes five tasks, each with numbered steps. Tasks are discrete operations needed to accomplish the SACM workflow while the steps describe discrete actions to complete the task. Both tasks and steps are numbered herein and referenced in the workflow separated by a decimal point.

Tasks are presented in an order that provides context for each sequential Task. Tasks 1 and 2 provide necessary calibration relationships and tasks 3, 4 and 5 provide the workflow that applies SACM to transform TOA rasters for VNIR or panchromatic bands into rasters of surface reflectance. As a person with ordinary skill in the art will understand, the tasks and steps described to calibrate and apply SACM can be performed in different order or with alterations that will yield substantially the same results as the processes described here; specifically using the pinwheel-effect-derived mathematics to correct TOA data to surface reflectance. All such alterations are incorporated within this SACM workflow description.

Task 1. Calibrate an NDVI Surface Reflectance Threshold to define minB values that represent pixels with sufficiently verdant vegetation (SVV); SVV defined as having surface reflectance NDVI greater than a threshold representing any continuous, vigorous, and healthy canopy exposed to the open sky (i.e., not shaded). The NDVI Surface Reflectance Threshold is translated into an NDVI TOA Threshold that differentiates SVV in this calibration step to prepare for mapping TOA minB for input to SACM correction.
 1. Choose multiple SVV in plots that meet the requirements of homogeneous, continuous, vigorous, and healthy canopies.
 2. Perform spectrometer measurements over the canopies generating surface reflectance.
 3. Obtain relative spectral response (RSR) for an EOS to be calibrated for all of the VNIR bands.
 4. Translate the spectral data into the VNIR reflectance that the EOS would measure.
 5. Pool the dataset from multiple plots and measure the median blue surface reflectance—this is the Calibrated minB used in later steps to determine TOA minB from samples obtained over a calibration target.
 6. From the pooled dataset, calculate NDVI using the NDVI Equation. Choose the lowest value of measured NDVI over the SVV, this is the NDVI Surface Reflectance Threshold that will be used later to determine whether a pixel reflectance was generated by SVV.
 7. Determine the red surface reflectance that contributed to the NDVI Surface Reflectance Threshold, this value is the Red Surface Reflectance Reference.
 8. Determine the NIR surface reflectance that contributed to the NDVI Surface Reflectance Threshold, this value is the NIR Surface Reflectance Reference.

Task 2. Calibrate the SACM Relationships for all VNIR bands of the EOS, these bands commonly being at least blue, green, red and NIR bands. These bands are referred to collectively as "each band". Calibration enables an EOS to use the remaining steps to derive surface reflectance.
 1. Establish a pair of calibration targets of known surface reflectance, light and dark of sufficient size to contain at least one pure pixel of the EOS.
 2. Measure the surface reflectance of these targets with a spectrometer and translate the reflectance into the bands of the EOS using the RSR. Repeat this step every 3-4 months to measure any changes to the surfacing of the target reflectance.
 3. Acquire a TOA reflectance image of the calibration targets that includes the VNIR bands.
 4. Extract the dark and light TOA pixel reflectances for at least one pixel of the calibration targets for each band.
 5. Calculate a linear relationship for each band from the data points representing the pixels of the dark and light targets, with the of TOA reflectance as the y value and known surface reflectance the x value for all bands (FIG. 3).
 6. In 2-dimensional space, plot a line based on the dark and light points for the TOA blue reflectance vs. blue surface reflectance as in FIG. 3. Using this line, calculate the TOA blue reflectance at the median blue surface reflectance of Step 1.5. This is the TOA minB that represents the lumped effect of the atmosphere upon reflectance.
 7. Repeat steps 2.3 through 2.6 for images obtained over the calibration target under variable conditions of atmospheric effect from clear to nearly obscured with haze.
 8. For each overpass, generate the same data: a TOA minB, dark and light TOA reflectance and dark and light surface reflectance for each of the VNIR bands.
 9. From the plot in 2-dimensional space, determine the slope and y-intercept for each VNIR band for each overpass.
 10. Combine the data of the multiple overpasses that constitute an EOS Calibration Set: slope and y-intercept values associated with each TOA minB for each VNIR band.
 11. Fit separate relationships for the slope and the y-intercept values that describe the correction band for each VNIR band for the range of TOA minB measured as in FIG. 3. This procedure concludes the SACM Calibration.

12. The SACM Calibration for slope and y-intercept enables surface reflectance calculation for any pixel value calibrated to the VNIR for the EOS based upon the TOA minB input. The slope and y-intercept values are determined by the TOA minB and surface reflectance is calculated for each pixel using the SACM Equation.

Task 3. Calibrate the NDVI TOA Threshold Relationship to define TOA minB values representing pixels with SVV. The NDVI Surface Reflectance Threshold generated in Step 1.6 can be translated for operational use into an NDVI TOA Threshold that differentiates SVV and therefore, a valid TOA minB. This calibrated threshold enables mapping TOA minB across the image to drive a spatially sensitive correction to surface reflectance for all VNIR bands.

1. Revisiting Step 1.6, determine the red surface reflectance and the NIR surface reflectance that contributed to the NDVI Surface Reflectance Threshold.
2. Using the SACM Calibration for the red band from Task 2 and the Red Surface Reflectance Reference from Step 1.7, calculate a TOA red Reflectance Reference value for each of a range of minB TOA values.
3. Using the SACM Calibration for the NIR band from Task 2 and the NIR Surface Reflectance Reference from Step 1.8, calculate an Reflectance Reference value for each of a range of minB TOA values.
4. Calculate NDIV TOA values from the TOA red and TOA NIR reflectance reference values developed in steps 3.2 and 3.3 using the NDVI equation.
5. Fit a curve of the resulting NDIV TOA values with TOA MinB as the independent variable. This relationship constitutes a translation of the single value of NDVI Surface Reflectance Threshold into a curve for operational application, the NDVI TOA Threshold Relationship.
6. The NDVI Surface Reflectance Threshold is used to assess whether a low value of TOA blue reflectance is determined from SVV and if so, is then acceptable as a TOA minB on which to base SACM correction.

Task 4. Fill a SACM Input Raster with TOA minB to enable sensitive correction of TOA reflectance to surface reflectance across an EOS image of SVV. TOA MinB, defined by SVV, is confirmed through statistical sampling in a grid pattern across the image to set TOA minB values, gridcell by gridcell across the image.

1. Remove all pixels from consideration that have TOA NIR values lower than a limit set to exclude low blue reflectance of pixels influenced by water absorption rather than by plant canopies and the light that is used in photosynthesis.
2. For each overpass to be corrected, calculate a raster of NDIV TOA according to the NDVI Equation using inputs of TOA rasters of red and NIR bands.
3. Use gridcells pixels to form a statistical population of samples for discrete locations across the image. This evaluation is made sequentially moving across and down the image with no gridcell overlap. For each gridcell, determine the lowest and highest TOA blue reflectance pixel to test whether lowest blue reflectance pixel value is from SVV, and therefore representative of SVV. The highest blue reflectance is applied only if SVV is absent in the gridcell, in which case TOA minB is determined in Task 5. Gridcells can be any desired configuration, for example containing 10×10=100 pixels
4. The lowest blue reflectance for the gridcell is evaluated for SVV using the NDVI TOA Threshold Relationship developed in Tasks 1 and 3. The NDVI TOA Threshold is calculated for the lowest TOA blue pixel reflectance in the grid and compared to the NDIV TOA calculated in Step 4.2.
5. If the NDIV TOA value for the lowest blue reflectance pixel in the gridcell is greater than the NDVI TOA Threshold value, the pixel is confirmed to contain SVV and the lowest blue reflectance pixel value is accepted as a valid TOA minB for the gridcell.
6. All pixels within the gridcell containing a valid TOA minB are the assigned that TOA minB value and the process moves to the next gridcell.
7. If the result for the NDIV TOA Threshold testing rejects the candidate lowest blue reflectance value in the gridcell, the sampling for that gridcell can be enlarged to look for a valid TOA minB by increasing the area searched. This expansion can conveniently be made by increasing a layer of gridcells around the gridcell in question that remains as a centroid, thus expanding by an odd number of gridcells, for example 3×3 gridcells, 5×5 gridcells, 7×7 gridcells, etc.
8. The enlargement and expansion of the gridcell to look for a valid TOA minB must be limited because, as distance out from the centroid increases, the value obtained of TOA minB becomes less indicative of the value in that centroid. For example, stopping the gridcell evaluation at an expansion of a 50×50 gridcell area would yield a super pixel of gridcells of 5×5 kilometers.
9. Any centroid gridcell not filled in this process of expanding the region evaluated can be filled through interpolation and extrapolation using geostatistical methods, for example kriging or inverse distance weighting methods.

Task 5. Fill the SACM Input Raster gridcells lacking SVV after Task 3 can be accomplished by inclusion of calibrated ancillary data or by setting values that are appropriate for the location and time of year. This present method effectively redefines AOD and other atmospheric influences into the lumped sum metric of TOA minB. Hence, for SACM application of ancillary EOS, TOA minB can be calibrated to the ancillary data.

1. Choose one of three operations for the location and time of year
2. Use an expected value for TOA minB where ancillary data are not available. The chosen TOA minB is input into the SACM input raster.
3. Use ancillary data. For this application, TOA minB must be calibrated to the estimates of AOD developed from the ancillary data. The method chosen will set the values as a SACM Input Raster as in Task 3.

Task 6. Operational correction to surface reflectance by SACM can be performed with the SACM Input Raster. This correction employs the SACM Equation and the SACM Calibration of Task 2.

1. The minB values in the SACM Input Raster specify the correction for each pixel of the EOS image. The minB values are employed in the SACM Calibration output from Task 1 to calculate two additional rasters for each band; slope and y-intercept that are calculated for each pixel across the image. For example, to correct four VNIR bands, this requires calculation of eight rasters.

2. For calculation of a surface reflectance raster for each band, the SACM Equation requires only three raster inputs, the TOA value, and the slope and y-intercept of each SACM correction. These rasters are the input necessary calculation of surface reflectance according to the SACM Equation as raster math that then outputs the surface reflectance for each band for each pixel across the image. This step completes the operation of SACM.

Although the invention has been described in detail with reference to these preferred embodiments, other embodiments can achieve the same results. The present apparatus can be practiced employing generally conventional materials and equipment. Accordingly, the details of such materials and equipment are not set forth herein in detail. In this description, specific details are set forth, such as specific material, structures, processes, etc. to provide a thorough understanding of the present invention. However, as one having ordinary skill in the art would recognize, the present invention can be practiced without resorting strictly only to the details specifically set forth. In other instances, well known processing structures have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modification of the invention will be obvious to those skilled in the art and it is intended to cover in the appended claims all such modifications and equivalents. The disclosures of all patents identified hereinabove are incorporated by reference.

I claim:

1. A method for correcting to surface reflectance a top-of-atmosphere (TOA) reflectance, the method comprising:
    obtaining surface spectrometric data for Sufficiently Verdant Vegetation (SVV), the surface spectrometric data including a surface reflectance of the SVV in a blue spectral band;
    calibrating a Simplified Atmospheric Correction Method (SACM) that is configured to convert TOA reflectance to surface reflectance for multiple spectral bands in a visual and near infrared (VNIR) portion of a spectrum across a range of blue reflectance inputs;
    determining that one or more pixels of an Earth observation satellite (EOS) image comprising blue TOA reflectance values were generated from—SVV and, upon so determining, determining atmospheric effects in locations surrounding the one or more pixels based on a difference between the blue TOA reflectance values for the one or more pixels and the surface spectrometric data for the SVV;
    mapping a raster of the blue TOA reflectance values, or derivatives thereof, the raster representing spatially variable atmospheric effects across the EOS image; and
    employing the raster and the SACM to correct, to surface reflectance, a plurality of pixels of the EOS image.

2. The method of claim 1, wherein obtaining the surface spectrometric data for the SVV comprises:
    obtaining a relative spectral response (RSR) for a collection of VNIR bands of the EOS which include a blue, a red and a near infrared (NIR) band;
    selecting a homogeneous vegetation canopy that is confirmed visually to be a continuous, vigorous, and healthy vegetation canopy constituting a sample of SVV;
    employing a field spectrometer to measure target surface reflectances for a ground target to obtain a dataset of groundtruth measurements;
    calibrating, using the RSR, the dataset of groundtruth measurements to deliver VNIR data for each VNIR band measured by the EOS;
    measuring with the field spectrometer VNIR surface reflectance over a plurality of samples of SVV using the field spectrometer to obtain sampling data and delivering the sampling data calibrated to the spectral band RSRs of the EOS;
    determining a surface reflectance NDVI from a red measurement and from an NIR measurement obtained for a groundtruth reflectance measurement of one of the SVV samples according to an NDVI Equation;
    pairing the surface reflectance NDVI with a blue surface reflectance measured for the one SVV sample;
    calculating the surface reflectance NDVI for the groundtruth measurements;
    combining the sampling data from the plurality of SVV samples with their respective blue surface reflectance values;
    selecting a lowest surface reflectance NDVI value, said value serving as the NDVI Surface Reflectance Threshold that, when exceeded by a surface reflectance NDVI for a particular pixel, defines that particular pixel as containing SVV;
    selecting a Red Surface Reflectance Reference value and an NIR Surface Reflectance Reference value that contributed to determination of the lowest surface reflectance NDVI in the plurality of SVV samples; and
    determining a median value for blue surface reflectance from the dataset of groundtruth measurements.

3. The method according to claim 2, wherein calibrating the SACM comprises:
    establishing a homogeneous dark calibration target and a homogeneous light calibration target that are exposed to an open sky and sized sufficiently to contain at least one pure pixel on each of a plurality of EOS images selected to undergo calibration;
    measuring the respective surface reflectance of the dark and light calibration targets using the field spectrometer and, with target measurements so obtained, calibrated to the RSR for each of a collection of EOS VNIR spectral bands, the bands comprising at least blue, red and NIR;
    acquiring image rasters generated by an overpass of the EOS, comprising measurements of a plurality of top-of-atmosphere (TOA) reflectances for each pixel across a raster of the image for each VNIR spectral band;
    acquiring multiple image rasters obtained during a plurality of overpasses that occurred under a wide range of atmospheric conditions that affected surface reflectance;
    extracting at least a pixel of TOA reflectance over the dark and light calibration targets for each VNIR spectral band of each of the plurality of overpasses;
    pairing the TOA reflectance measurements with a plurality of measured respective surface reflectances for the dark and light calibration targets for each of the VNIR spectral bands;
    generating a pair of calibration points in two-dimensional space representing the dark and light calibration targets, and having the TOA reflectance as a y value, and surface reflectance as an x value for each VNIR spectral band of each of the plurality of EOS overpasses, determining a slope and a y-intercept of a line defined by the pair of calibration points, for each of the VNIR spectral bands of the EOS, thereby describing a Blue TOA reflectance line;

using the Blue TOA reflectance line, calculating a Blue TOA reflectance at a Calibrated MinB, the Blue TOA reflectance being a scalar value representing a lumped atmospheric effect upon TOA minB;

repeating the steps of (i) extracting the pixel of TOA reflectance over the dark and light calibration targets, (ii) pairing the TOA reflectance with the plurality of measured respective surface reflectances, (iii) generating the pair of calibration points, (iv) determining the slope and the y-intercept, and (v) calculating the Blue TOA reflectance at the Calibrated MinB, for each image from the plurality of overpasses, generating for each image the TOA minB and the slope and y-intercepts for the VNIR spectral bands to define a SACM correction to surface reflectance;

collecting the TOA minBs for the images the plurality of overpasses and the slope and y-intercepts for each of the VNIR spectral bands for the EOS overpasses that occurred for a wide range of atmospheric conditions that affected surface reflectance, said collection of TOA minBs, slopes and y-intercepts comprising an EOS Calibration Set;

establishing a first calibration curve in 2-dimensional space, using the slopes as y values and the TOA minBs as x values from the EOS Calibration set for each VNIR spectral band;

performing a SACM Slope Calibration by implementing a statistical model to predict slope response determined by the TOA minB for the EOS for each VNIR spectral band;

establishing a second calibration curve in two-dimensional space, using the y-intercept as y values and TOA minB as x values for each VNIR spectral band; and performing a SACM Y-intercept Calibration by predicting with a statistical model a y-intercept response determined by the TOA minB of the EOS for each VNIR spectral band.

4. The method of claim 3, wherein determining that the one or more pixels of the EOS image comprising blue reflectance values were generated from the SVV and determining atmospheric effects in locations surrounding the one or more pixels based on a difference between the blue TOA reflectance values for the one or more pixels and the surface spectrometric data for the SVV comprises:

returning to the groundtruth measurements;

inverting the SACM Slope Calibration and the SACM Y-intercept Calibration for the red band to calculate a plurality of Red TOA Reflectance Reference values for a range of TOA minB input values of the EOS Calibration Set;

inverting the SACM Slope Calibration and the SACM Y-intercept Calibration for the red band to calculate a plurality of NIR TOA Reflectance Reference values for the range of TOA minB input values of the EOS Calibration Set;

calculating the NDVI TOA Threshold values using the NDVI Equation from the Red TOA Reflectance Reference values and NIR TOA Reflectance Reference values for the range of TOA minB inputs values;

combining in 2-dimensional space, the NDVI TOA Threshold values as y values as a factor of the TOA minB inputs x values;

fitting the combined NDVI TOA Threshold values as an NDVI TOA Threshold Relationship defining the NDVI TOA threshold for any input TOA minB value, applying a NDVI TOA Threshold Relationship operationally by calculating the NDVI TOA for a pixel of interest;

calculating the NDVI TOA threshold value for the Blue TOA reflectance value for said pixel of interest;

comparing the NDVI TOA of said pixel of interest and the NDVI TOA Threshold value, and if the NDVI TOA of said pixel of interest is greater than the NDVI TOA Threshold, the defining the pixel corresponding to SVV, wherein the Blue TOA reflectance value of the pixel is accepted as a TOA minB for that location, the accepted TOA minB operating as an independent variable for the SACM correction.

5. The method of claim 4, wherein mapping the raster of the blue TOA reflectance values, or derivatives thereof, comprises:

selecting an image from an EOS that has undergone calibration;

removing pixels with low values of blue reflectance due to the light absorbance by water and having NIR TOA values less than a NIR TOA threshold of 0.2 across the EOS image;

sampling in a series of non-overlapping gridcells of multiple pixels for the purpose of defining statistical properties of TOA minB across the EOS image;

identifying, for a gridcell selected from the series of non-overlapping gridcells, a minimum pixel value of Blue TOA reflectance from within each of the series of non-overlapping gridcells;

extracting a red TOA reflectance and an NIR TOA reflectance from the pixel corresponding to the minimum Blue TOA reflectance in the gridcell;

calculating an NDVI TOA from the red TOA reflectance, and from the NIR TOA reflectance corresponding with the minimum Blue TOA reflectance for the gridcell using the NDVI Equation;

calculating the NDVI TOA Threshold from the NDVI TOA Threshold Relationship using as input the minimum Blue TOA reflectance value for the gridcell;

comparing NDVI TOA to the NDVI TOA Threshold corresponding to the minimum blue TOA reflectance value for the gridcell; and accepting a minimum Blue TOA reflectance as a TOA minB if its value is greater than the NDVI TOA Threshold calculated for a minimum blue reflectance value.

6. The method of claim 5, wherein employing the raster of the blue TOA reflectance values and the SACM to correct, to surface reflectance, the plurality of pixels of the EOS image comprises:

employing the SACM Input Raster and the SACM Slope Calibration generated for the EOS to generate a raster of slope values determined by the TOA minB at each pixel value, thereby generating a slope raster for each VNIR band;

employing the SACM Input Raster and the SACM Y-intercept Calibration generated for the EOS to generate a raster of slope values determined by the TOA minB at each pixel value thereby generating a slope raster for each VNIR band; and applying a closed form equation to calculate a surface reflectance raster for each VNIR band using raster math from three raster inputs—the TOA reflectance raster for the VNIR band measured by the calibrated EOS, and the slope raster and y-intercept raster.

* * * * *